(12) United States Patent
Rose et al.

(10) Patent No.: US 6,571,927 B2
(45) Date of Patent: Jun. 3, 2003

(54) TRANSMISSION SYNCHRONIZER PIN ARRANGEMENT

(75) Inventors: Jonathan S. Rose, Laurinburg, NC (US); Kenneth T. Picone, Pinehurst, NC (US); Thomas G. Ore, Kalamazoo, MI (US)

(73) Assignee: ZF Meritor, LLC, Maxton, NC (US)

(*) Notice: Subject to any disclaimer, the term of this patent is extended or adjusted under 35 U.S.C. 154(b) by 0 days.

(21) Appl. No.: 10/152,508

(22) Filed: May 21, 2002

(65) Prior Publication Data

US 2002/0189915 A1 Dec. 19, 2002

Related U.S. Application Data

(62) Division of application No. 09/235,180, filed on Jan. 22, 1999, now Pat. No. 6,390,266.

(51) Int. Cl.$^7$ ................................................. F16D 23/06
(52) U.S. Cl. ................................................. 192/53.331
(58) Field of Search ..................... 192/53.331, 53.332, 192/48.91; 74/339

(56) References Cited

U.S. PATENT DOCUMENTS

| | | | |
|---|---|---|---|
| 3,286,801 A | 11/1966 | Wojcikowski | |
| 3,695,403 A | * 10/1972 | Eastwood | 192/53.331 |
| 3,739,890 A | 6/1973 | Nolli | |
| 4,018,319 A | * 4/1977 | Thomas | 192/53.332 |
| 5,103,952 A | 4/1992 | Reynolds | |
| 5,641,044 A | 6/1997 | Morscheck | |
| 5,743,143 A | 4/1998 | Carpenter | |

FOREIGN PATENT DOCUMENTS

EP 0713024 A2 * 5/1996

* cited by examiner

Primary Examiner—Ankur Parekh
(74) Attorney, Agent, or Firm—Carlson, Gaskey & Olds

(57) ABSTRACT

A plurality of pins couple the cones and the shift collar of a transmission auxiliary section together so that they rotate as a group. When the shift collar is moved laterally from neutral, the shift collar engages blocking surfaces on the pins and moves the corresponding cone to match the speeds of the input shaft and the corresponding gear. The invention shortens the pin lengths of the synchronizer and therefore the length of the transmission, by eliminating contact between the shift collar and the small diameters of the pins in the neutral position.

5 Claims, 6 Drawing Sheets

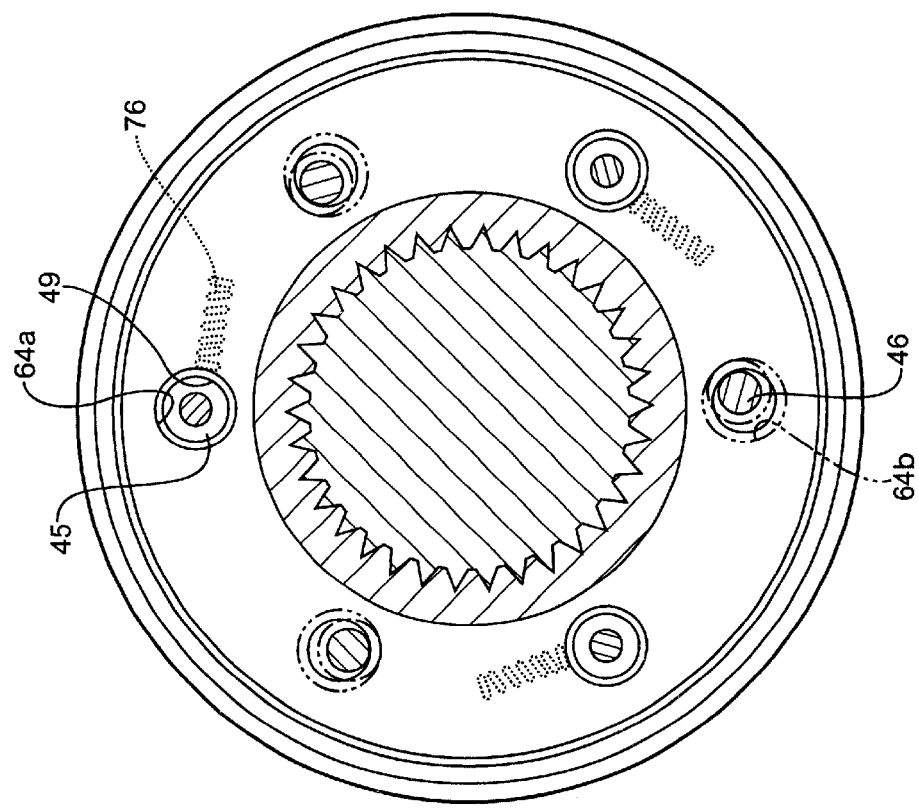
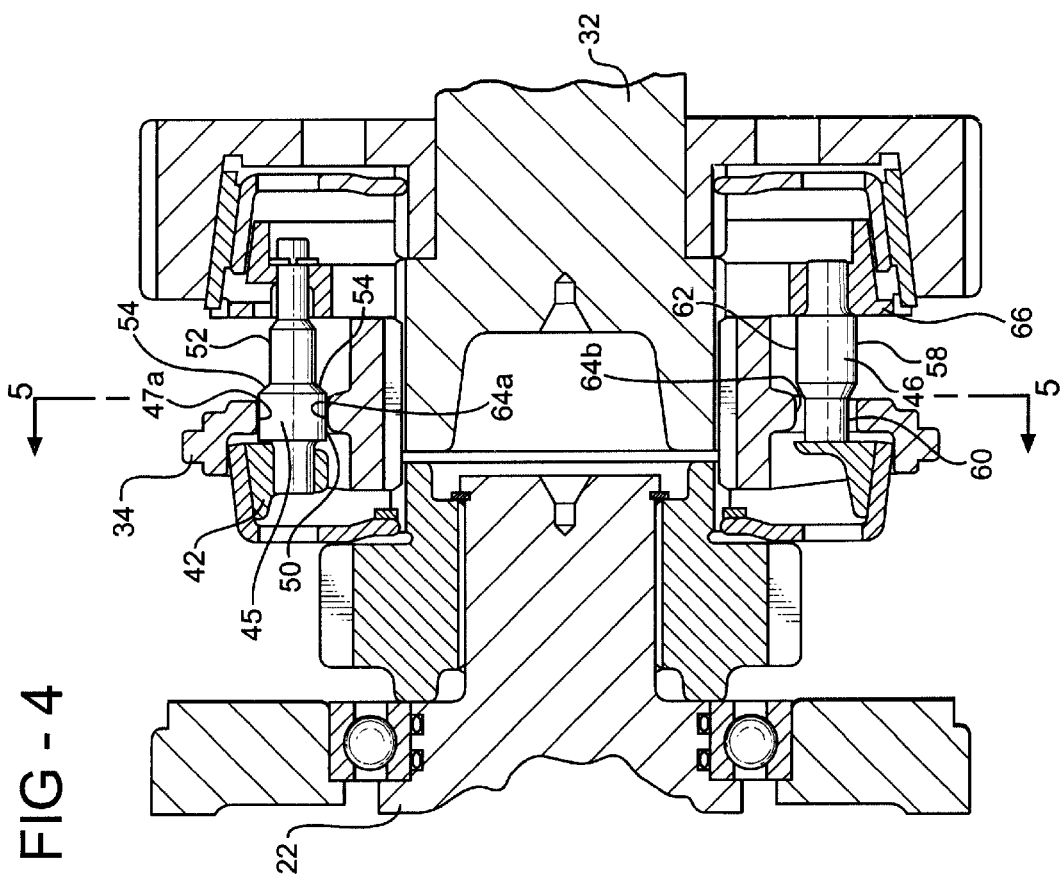

TRANSMISSION SYNCHRONIZER PIN ARRANGEMENT

RELATED APPLICATIONS

This application is a divisional of application Ser. No. 09/235,180 filed Jan. 22, 1999, now U.S. Pat. No. 6,390,266.

BACKGROUND OF THE INVENTION

This invention relates to pin arrangements used in cone synchronizers to facilitate shifting between high and low ranges in a multispeed transmission.

In the prior art, heavy vehicle transmissions typically consist of two sections. A first main section includes a plurality of selectable gears to provide different speed ratios. A second auxiliary section takes an input from the first section and modifies the speed to provide a multiple of additional speeds. Auxiliary sections include both range and splitter sections.

The range section shifts the speeds within the main transmission section between two ranges, namely high and low. The background will be explained with reference to a range section, but it should be understood it may also apply to splitter sections. Known range sections move a shift collar to connect an input shaft directly to an output shaft, thereby creating a high speed. Alternatively, the collar connects the input to a gear reduction to drive the output shaft to provide the low function.

A synchronizer may be associated with both the high and low range positions to assist the transmission in beginning to move the gears to the desired speed just prior to engagement. The synchronizer includes a first and second cone in spaced relationship with the shift collar interposed between. A plurality of pins couple the cones and the shift collar together so that they rotate as a group. When the shift collar is moved laterally from neutral into high or low range, the shift collar engages blocking surfaces on the pins and moves the corresponding cone to match the speeds of the input shaft and the corresponding gear.

Since pin length determines, in part, the length of the synchronizer and therefore the length of the transmission, it is desirable to utilize the shortest pin length possible. FIG. 1A depicts a prior art configuration utilizing preblocked pins 2, 4 while FIG. 1B depicts a prior art configuration utilizing preenergized pins 15. Reference will now be made to both the preblocked synchronizers and preenergized synchronizers simultaneously with preenergized synchronizer reference numerals in parentheses. These prior art configurations require that during a shift from one range to another (for example from left to right in the Figures), the shift collar disengages the large diameter surfaces 6 (16), then engages the small diameter surfaces 8, 12 (18), and engages the blocking surfaces 13 (19) thereby causing the cone 66 (66) to move to the right to synchronize a gear. Once synchronized, the shift collar engages the large diameter surfaces 11 (16).

Similarly, when a shift is made from right to left, the shift collar disengages the large diameter surfaces 11 (16), then engages the small diameter surfaces 8, 12 (18), and engages the blocking surfaces 10 (19) thereby causing cone 42 (42) to move to the right to synchronize a gear. Once synchronized the shift collar engages the large diameter surfaces 6 (16).

By eliminating engagement of the shift collar with the small diameter surfaces in the neutral position between range shifts, the overall pin length may be reduced thereby reducing the length of the synchronizer and transmission.

SUMMARY OF THE INVENTION

In a preferred embodiment of this invention, a plural cone synchronizer is incorporated into an auxiliary section of a heavy vehicle transmission. First and second cones are in spaced relationship from one another and rotate about a common axis. A shift collar is interposed between the first and second cones and rotates about and is slidable along the axis to and from a neutral position. The shift collar has first and second sets of apertures therethrough which have engaging surfaces.

A plurality of preblocked pins interconnect the first and second cones. A first set of pins extend from the first cone through the first set of apertures. The first set of pins have first large diameter surfaces adjacent to the first cone and first small diameter surfaces opposite the first large diameter surfaces. First blocking surfaces are disposed between the first small and large diameter surfaces. Similarly, a second set of pins extend from the second cone through the second set of apertures. The second set of pins have second large diameter surfaces adjacent to the second cone and second small diameter surfaces opposite the second large diameter surfaces. Second blocking surfaces are disposed between the second small and large diameter surfaces.

The pins collectively have neutral surfaces that are engageable with the engaging surfaces when the shift collar is in the neutral position. The engaging surfaces are prevented from simultaneously engaging with the first and second small diameter surfaces in the neutral position because of the width of the engaging surfaces and the location of the first and second blocking surfaces relative to one another. In this way, the contact with the small diameters is eliminated when shifting between high and low range.

A method of shifting between a plurality of gears using the above preferred pin arrangement includes decoupling a first gear and a shift by moving a synchronizer shift collar out of engagement with a set of first large diameter pin surfaces. The next step includes synchronizing a second gear and the shaft by moving the shift collar into engagement with a set of second blocking pin surfaces. Finally, the last step includes coupling the second gear and the shaft by moving the shift collar into engagement with a set of second large diameter pin surfaces.

These and other features of the present invention can be best understood from the following specification and drawings, of which the following is a brief description.

BRIEF DESCRIPTION OF THE DRAWINGS

FIG. 4 is a cross-sectional view similar to FIG. 2 with the range section in high range;

FIG. 5 is a cross-sectional view along line 5—5 as shown in FIG. 4;

DESCRIPTION OF THE PREFERRED EMBODIMENT

Figure 2:
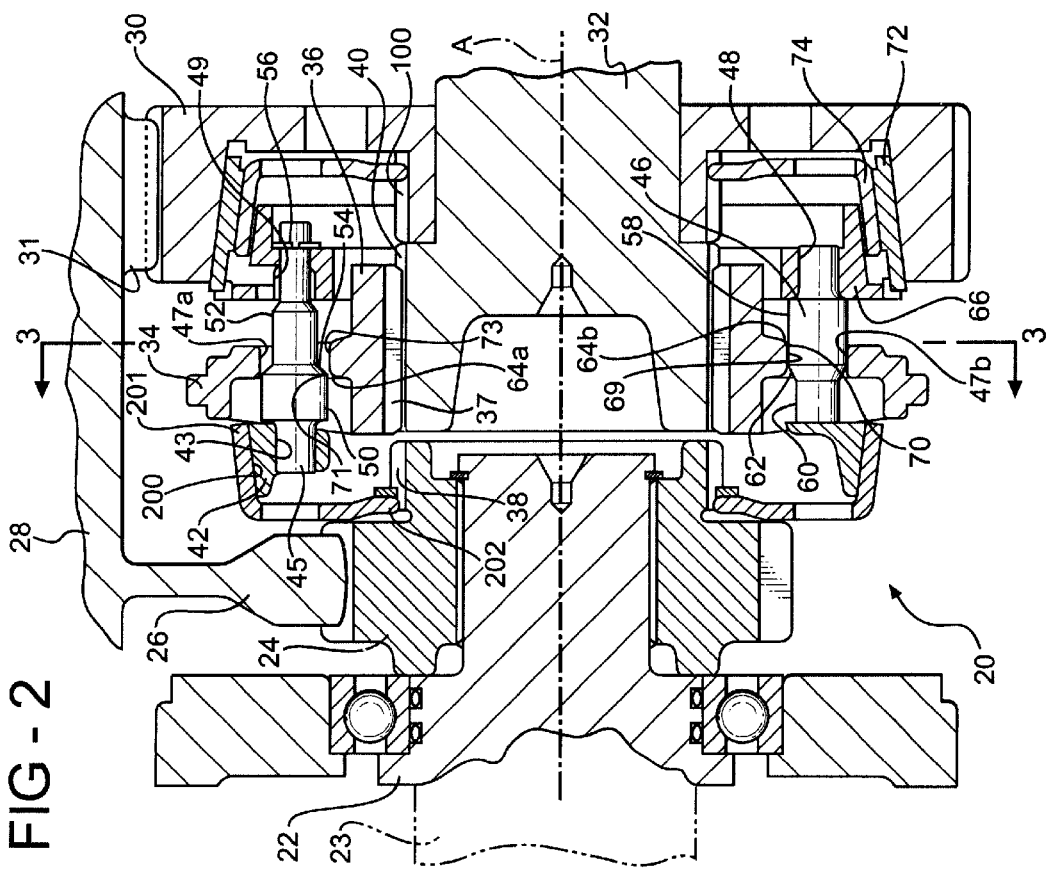
FIG. 2 is a cross-sectional view through the inventive synchronizer with the range section in the neutral position prior to upshifting into high range.

Heavy vehicle transmissions typically consist of two sections. Referring to FIG. 2, a first main section 23 includes a plurality of selectable gears to provide different speed ratios. A second auxiliary section 20 takes an input from the first section and modifies the speed to provide a multiple of additional speeds. Section 20 could be a range section, a splitter section, or a combination of the two. The invention will be described with reference to a range section, but it should be understood that it has benefits in other types of auxiliary sections.

Range section 20 receives an input shaft 22 from a main transmission section 23. Input shaft 22 drives a gear 24 engaged with a countershaft gear 26. Countershaft gear 26 drives a countershaft 28 which, in turn, drives gear 31. Gear 31 is engaged with a gear 30 mounted on an output shaft 32. The input shaft 22 is selectively connected either directly to output shaft 32 for high range, or through the gears 26. 31 and 30 to the output shaft 32 to achieve a speed reduction and low range. A shift collar 34 achieves the selective connection. Shift collar 34 includes an engagement member 36 having internal teeth 37 which constantly engage teeth 40 on an output shaft 32.

The range section is shown in neutral with neither range engaged. In a position where collar 34 is moved to the left from the illustrated position, teeth 37 engage teeth 38 on gear 24. Rotation is then transmitted directly from input shaft 22 to output shaft 32. This position provides high range (FIG. 4).

Figure 8:
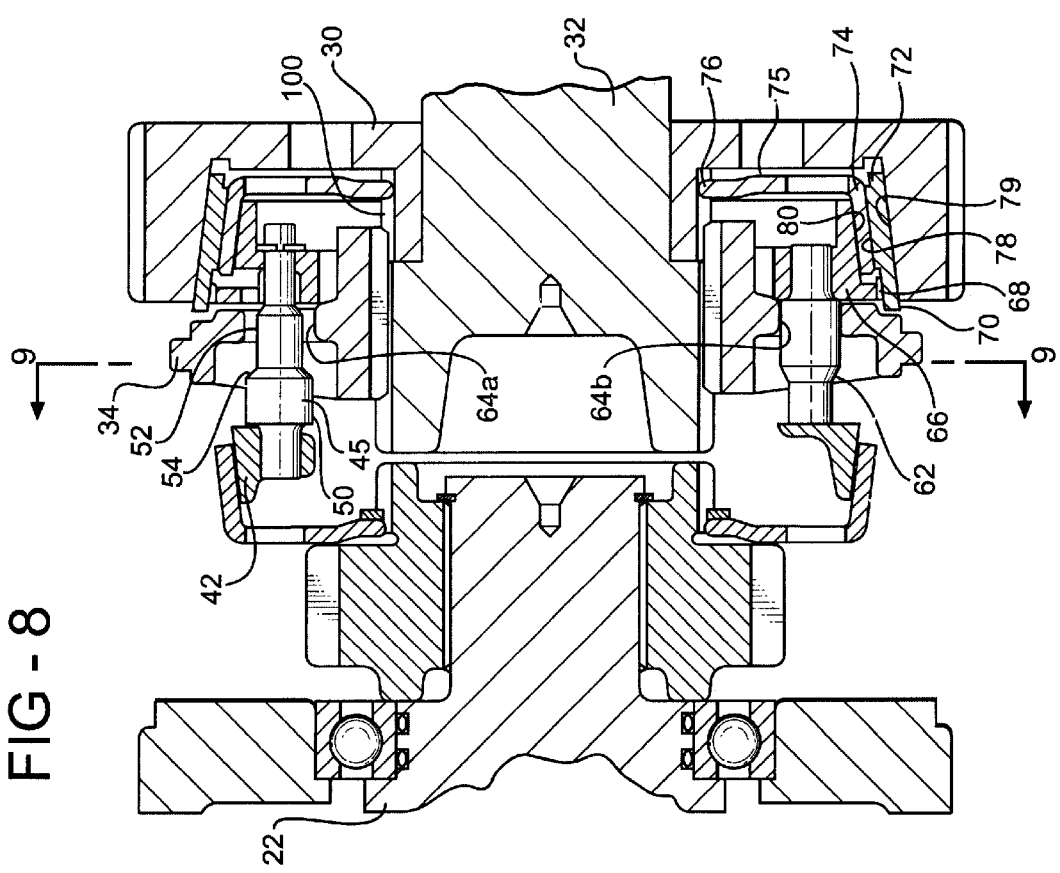
FIG. 8 is a cross-sectional view similar to FIG. 2 with the range section in low range.

When the transmission shifts to low range, collar 34 moves to the right from the illustrated position and teeth 37 engage teeth 100 of gear 30. In this position, gear 30 is now driven with output shaft 32. Rotation is transmitted through the countershaft gears and to the output shaft 32. There is a speed reduction provided by the gears 24, 26, 32 and 30 which results in a lower speed for the output shaft 32. This position provides the low range (FIG. 8).

A synchronizer is associated with both the high and low range positions to assist the transmission in beginning to move the gears to the desired speed just prior to engagement. The synchronizer has first 42 and second 66 cones in spaced relationship from one another that are rotatable about a common axis A. The first cone 42 is used for high range shifting while the second cone 66 is used for low range shifting. The first cone 42 is associated with the second cone 66 and a group of other low range synchronizer cones 72, 74 by a first set of preblocked pins 45. The first set of pins 45 are affixed in bores 43 in the first cone 42. The pins 45 extend through a first set of apertures 47a in the shift collar 34 and into slots 49 in second cone 66. In this manner, the pins 45 couple the cones 42, 66 and the shift collar 34 so that they rotate together about axis A. The slots 49 permit slight relative movement between the cones 42, 66.

The first set of pins 45 have first large diameter surfaces 50 adjacent the first cone 42 and first small diameter surfaces 52 opposite the first large diameter surfaces 50. Tapered first blocking surfaces 54 are disposed between the first large 50 and small 52 diameter surfaces. Clips 56 on ends of the first small diameter surfaces 52 retain the second cone 66 to prevent the second cone 66 from engaging the cones 72, 74 and inadvertently synchronizing the low range during a high range synchronization.

A second set of pins 46 extend from bores 48 in the second cone 66 through a second set of apertures 47b in the shift collar 34. The second set of pins 46 have second large diameter surfaces 58 adjacent the second cone 66 and second small diameter surfaces 60 opposite the second large diameter surfaces 58. Tapered second blocking surfaces 62 are disposed between the second large 58 and small 60 diameter surfaces. The second pins 46 keep the first 42 and second 66 cones spaced apart by at least the distance from the surface of the cone 66 to the end farthest from the second cone 66 on the small diameter surfaces 60.

The first 47a and second 47b sets of shift collar apertures have engaging surfaces 64a, 64b on their inner periphery which engage the blocking surfaces 54, 62 and the large diameter surfaces 50, 58 of the first 45 and second 46 sets of pins in the neutral position between range shifts. The shift collar apertures 47a, 47b include the tapered portions 70, 71 that mates with the blocking surfaces 54, 62 and includes the portion 69, 73 parallel with the large diameter surfaces 50, 58.

Figure 3:
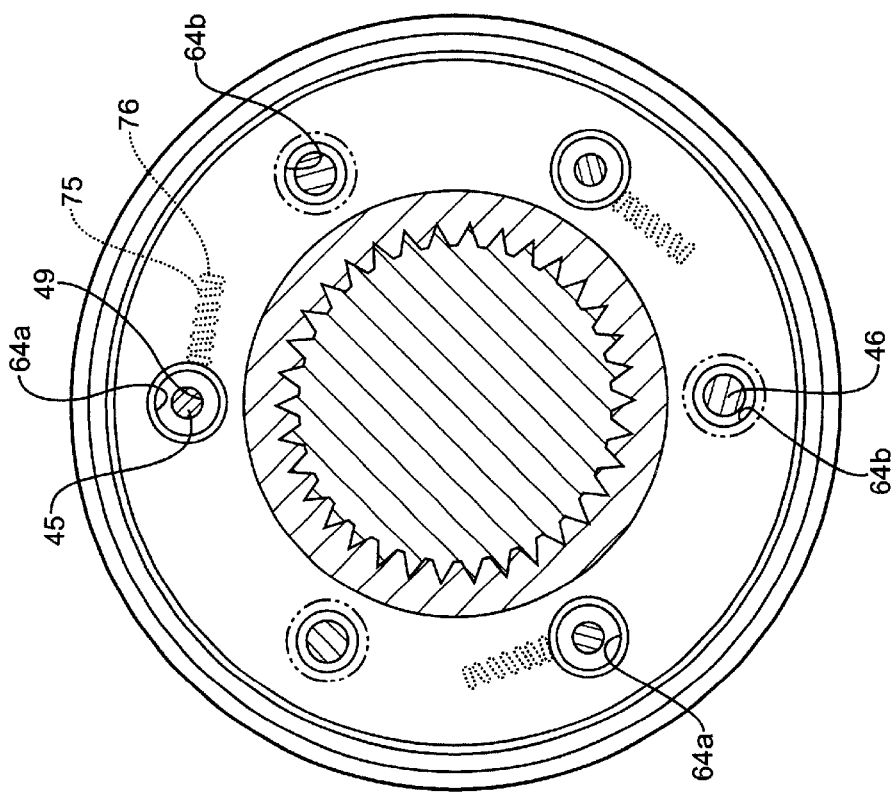
FIG. 3 is a cross-sectional view along line 3—3 as shown in FIG. 2.

Referring now to FIG. 3, the shift collar 34 further includes bores 75 with springs 76 for biasing the set of first pins 45. The bores 75 and springs 76 do not pass through section line 3—3 but are offset. Bores 75 and springs 76 are perpendicular to pin 45 and aligned with slots 49. The biasing springs 76 create a misalignment between the engaging surfaces 64a, 64b and the pins 45, 46 so that as the shift collar 34 is moved from neutral into a gear, the engaging surfaces 64a, 64b will be forced to contact the blocking surfaces 54, 62. Otherwise, the engaging surfaces 64a, 64b may pass by the blocking surfaces 54, 62 without applying force to the pins 45, 46 to move the cones 42, 66 and synchronize the input shaft 22 and the gears.

The shift from neutral (FIG. 2) into high range (FIG. 4) is discussed below. During the shift, the first cone 42 is moved by first synchronizer pin 45 when the collar 34 is moved to the left to achieve high range. The engaging surface 64a engages the blocking surfaces 54 on pins 45 and forces cone 42 to the left. A friction surface 200 formed on the inner periphery of cone 201 engages the synchronizer cone 42. Synchronizer cone 201 has splines 202 which engage mating splines 38 on gear 24. When the transmission is shifted to high range, the synchronizer cones 42 and 201 engage before teeth 37 and 38 engage. Thus, the cones begin to move gear 24 and shaft 32 to equal speeds prior to engagement.

Upon engagement of the teeth 37, 38 the first small diameter surfaces move within the slot 49 until the engaging surfaces 64a are fully engaged with the large diameter surfaces 50 of the first pins 45 thereby compressing the biasing springs 76, as shown in FIG. 5.

The pins 45, 46 collectively have neutral surfaces engageable with the engaging surfaces 64a, 64b when the shift collar 34 is in the neutral position. That is, the neutral surfaces include any pin surfaces that contact the engaging surfaces 64a, 64b when the shift collar 34 is in the neutral position. The engaging surfaces 64a, 64b are prevented from simultaneously engaging the first 52 and second 60 small diameter surfaces when the shift collar 34 is in the neutral position.

Figure 1A:
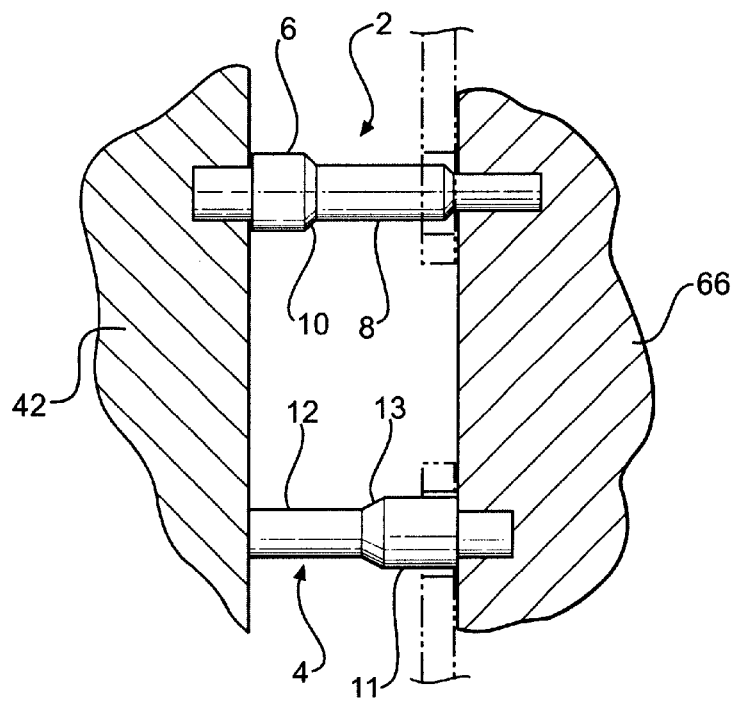
FIG. 1A is a potential cross-sectional view through a prior art synchronizer having preblocked pins.
Figure 1B:
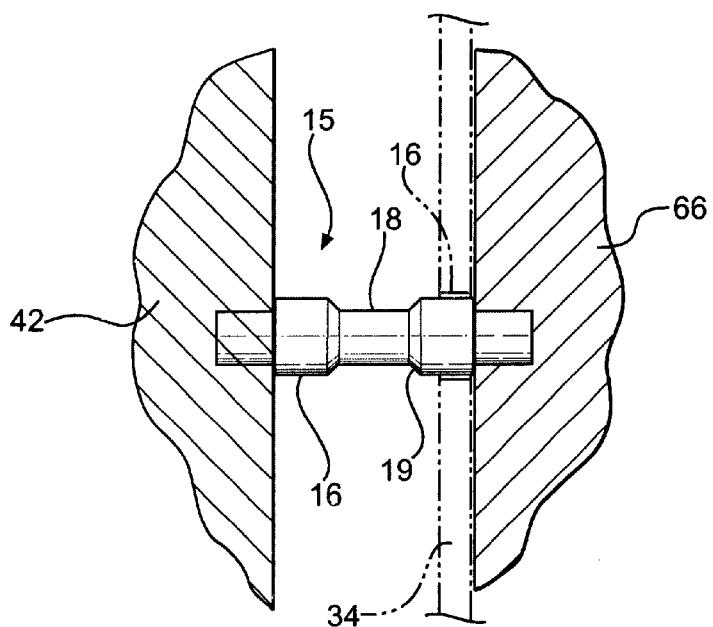
FIG. 1B is a partial cross-sectional view of an alternative prior art synchronizer having preenergized pins.

Said another way, the engaging surfaces 64a, 64b in the shift collar 34 will not be aligned with the small diameters 52, 60 at any location in the neutral position to where the engaging surfaces 64a, 64b could fully contact either the first small diameter surfaces 52 or the second small diameter surfaces 60 (see FIGS. 1 and 2). That is not to say, however, that the engaging surfaces 64a, 64b cannot be aligned with a small portion of both the first 52 and second 60 small diameters simultaneously.

Said yet another way, for the above shift sequence, in the prior art the engaging surfaces 64b would be permitted to engage the second set of small diameter surfaces 60 while the engaging surface 64a was still in engagement with the first set of small diameter surfaces 52 before the engaging surface 64a engaged the first blocking surfaces 54 and finally synchronized the input shaft 22 and output shaft 32.

In contrast for the same shift sequence, the present invention pin arrangement eliminates contact between the engaging surface 64b and the second small diameter surfaces 60 before the engaging surface 64a engages the first small diameter surfaces 52. By eliminating the intermediate shift sequence of the prior art, the present invention shortens the overall pin length by shortening the lengths of the small diameter surfaces 52, 60.

Figure 6:
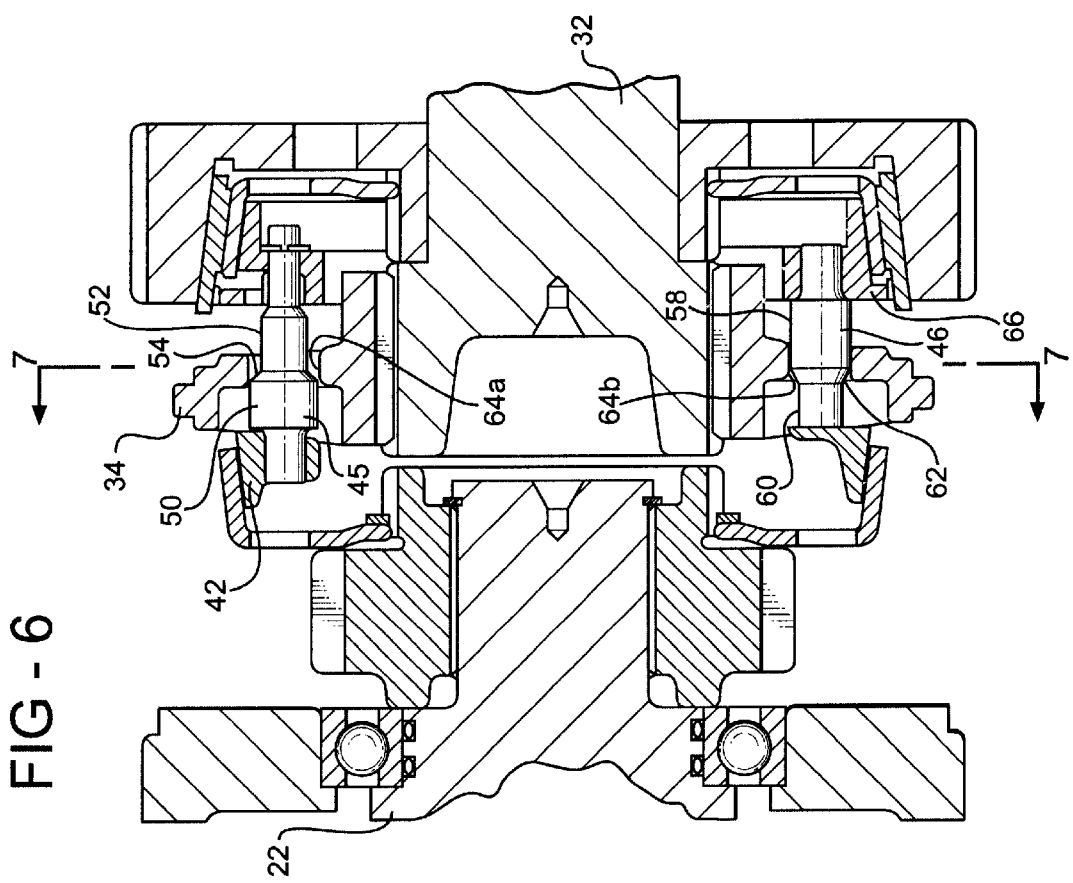
FIG. 6 is a cross-sectional view similar to FIG. 2 with the range section in the neutral position prior to downshifting into low range.

Referring now to FIG. 6, a position is depicted in which the shift collar is again in the neutral position but just prior to being shifted into low range. In this position the engaging surfaces 64a are still engaged with the first large diameter surfaces 50 while the engaging surfaces 64b re engaging the second blocking surfaces 62. However, the engaging surface 64a does not have to fully disengage either the large diameter surfaces 50 or the blocking surfaces 54 before being shifted into low range. That is, the engaging surface 64a does not have to engage the small diameter surfaces 52 before pin 46 engaging blocking surfaces 62, as in the prior art.

Figure 7:
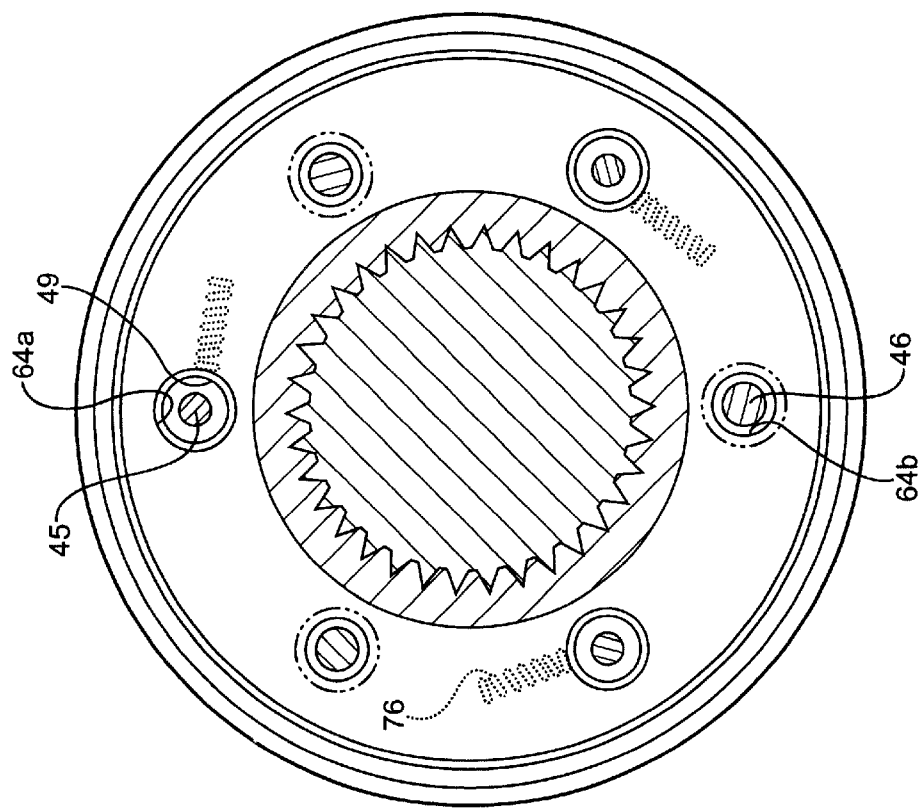
FIG. 7 is a cross-sectional view along line 7—7 as shown in FIG. 6.

FIG. 7 depicts the orientation of the pins 45, 46 relative to the engaging surfaces 64a, 64b.

During a low range shift, which occurs between the shift collar 34 portion shown in FIG. 6 to FIG. 8, the collar 34 is moved to the right to achieve low range. The engaging surface 64b engages second blocking surfaces 62 on the pins 64 and forces cone 66 to the right which interacts with cones 72 and 74 to synchronize the low range as discussed in more detail below.

Figure 9:
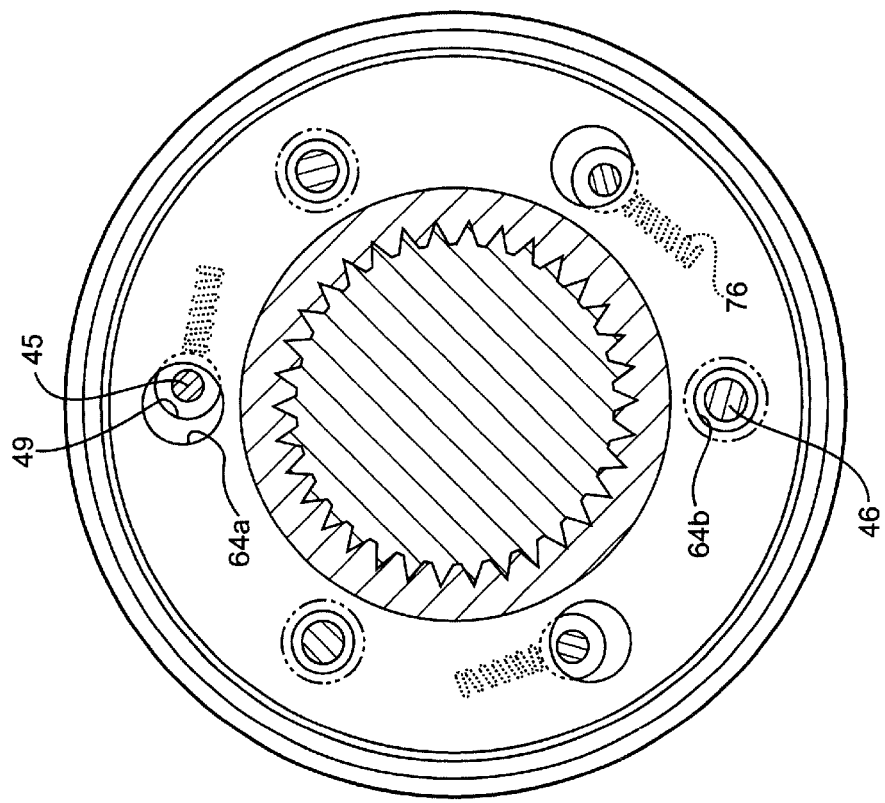
FIG. 9 is a cross-sectional view along line 9—9 as shown in FIG. 8.

FIG. 9 depicts the orientation of the pins 45, 46 relative to the engaging surfaces 64a, 64b.

Cone 66 has spaced outer surfaces 68 with intermediate gaps which receive tab 70 from an outer synchronizer cone 72. A middle synchronizer cone 74 has a radially inwardly extending portion 75 extending to a series of splines 76 received in teeth 100 on the gear 30. Thus, the middle synchronizer cone 74 tends to rotate with the gear 30, and as the collar 34 is shifted to the right, the frictional interaction between cones 66 and 74, 74 and 72 and 72 and gear 30 through the friction surfaces 80, 78 and 79, tend to move the cones 66 and 72 rapidly up to the same speed as the cone 74 and gear 30. Tabs 70 extend between and into gaps between sections 68 of cone 66 to ensure that the outer and inner cones rotate together. The teeth 100 are engaged by the teeth 76 of the middle cone. Thus, gear 30 tends to quickly reach the same speed as shaft 32. Again, the cones begin to drive the gear to the synchronized speed prior to teeth 37 engaging teeth 100.

Figure 11:
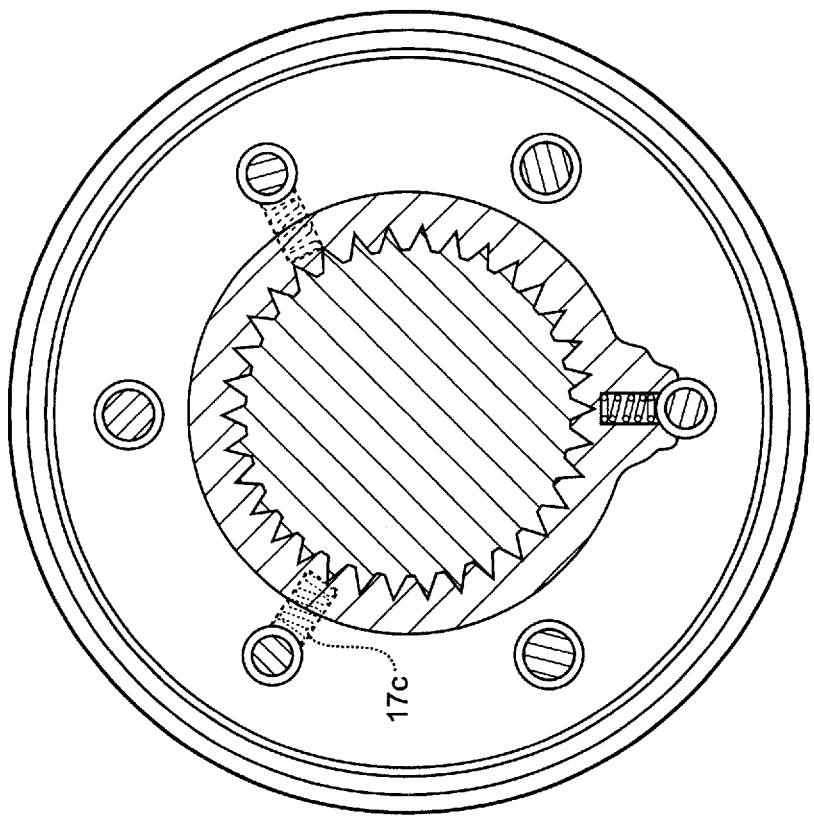
FIG. 11 is a cross-sectional view taken along line 11—11 as shown in FIG. 9.
Figure 10:
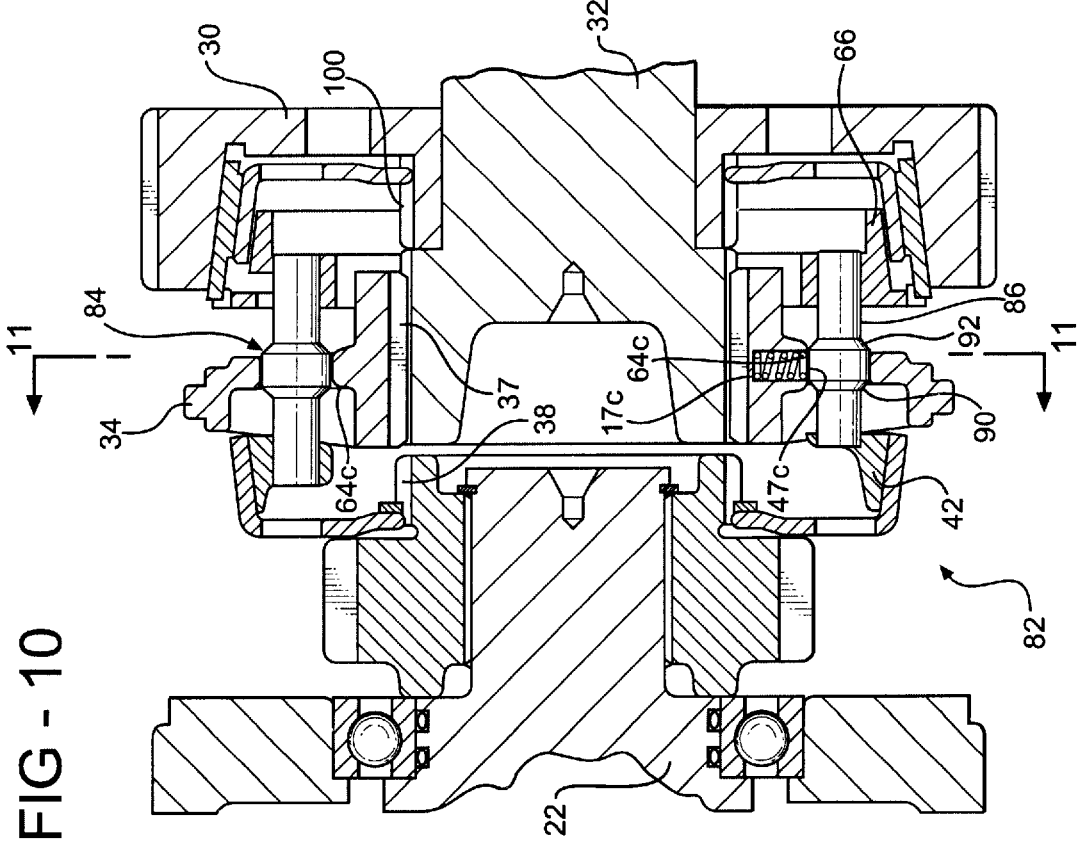
FIG. 10 is a cross-sectional view of an alternative embodiment of the present invention using preenergized pins.

An alternative embodiment of the present invention utilizing preenergized pins 84 is shown in FIGS. 10 and 11.

Instead of using two sets of pins 45, 46 like preblocked synchronizers 20, preenergized synchronizers 82 use only one set of pins 84. Preenergized synchronizers 82 operate on the same principle as preblocked synchronizers 20, that is, a biasing spring 17c engages a portion on the pins 84 to block contact of spline 37 with spline 38 or spline 100 prior to synchronization.

The pins 84 interconnect the cone 42, 66 together and extend through apertures 17c that have engaging surfaces 64c on collar 34. The pins 84 have small diameter surfaces 86 adjacent to the first and second cones 42, 66. Each pin 84 includes a large diameter surface 88 having opposing sides with first 90 and second 92 blocking surfaces positioned on each of the sides of the large diameter surfaces 88 respectively. The large diameter surfaces 88 are positioned substantially centrally along the small diameter surfaces 86 so that the large diameter surface 88 is disposed within the aperture 47c when the shift collar is in the neutral position, as shown in FIG. 10.

During a shift from high to low gear (left to right in FIG. 10), the engaging surface 64c engages the first blocking surface 90 when the shift collar decouples the input 22 and output 32 shafts which forces the pins 81 to the right thereby causing cone 66 to synchronize the output shaft 32 and reduction gear 30. Once the speeds of the output shaft 32 and reduction gear 30 sufficiently match, the shaft 32 and gear 30 may be coupled together.

Similarly, when shifting from low to high gear (right to left in FIG. 10), the engaging surface 64c engages the second blocking surface 92 when the shift collar decouples the output shaft 32 and the reduction gear 30. This in turn forces pins 84 to the left thereby causing cone 42 to synchronize the input shaft 22 and the output shaft 32. Once the speeds of the shafts 22, 32 sufficiently match, the shift collar 34 may couple the shafts 22, 32 together.

The preenergized pins 84 of the present invention rearranges the position of the blocking surfaces, or swaps positions of the blocking surfaces of the prior art (FIG. 1B), so that the clutch collar will engage the blocking surface associated with the gear to be engaged immediately after disengaging from a gear.

Again, while the disclosed synchronizers are shown in a range section, they could be used in a splitter section or a combined range/splitter section.

Although preferred embodiments have been disclosed, a worker in this art would recognize that certain modifications come within the scope of this invention. Thus, the following claims should be studied to determine the true scope of this invention.

What is claimed is:

1. A multispeed transmission having a synchronizer comprising:

first and second cones in spaced relationship from one another and rotatable about a common axis;

a shift collar interposed between said first and second cones and rotatable about and slidable along said axis to and from a neutral position, said shift collar having apertures therethrough with engaging surfaces;

a set of pins extending from said first cone through said apertures, said set of pins having small diameter surfaces adjacent said first and second cones and large diameter surfaces having opposing sides and positioned substantially centrally along said small diameter surfaces, and first and second blocking surfaces positioned on each of said sides of said large diameter surfaces respectively; and said engaging surfaces being engageable with said first blocking surface and sliding said second cone before engaging said second blocking surfaces, and said engaging surfaces being engageable with said second blocking surfaces and sliding said first cone before engaging said first blocking surfaces.

2. The transmission as set forth in claim 1 further including first and second gear positions wherein said shift collar is slidable therebetween with said neutral position interposed therebetween, said engaging surfaces of said apertures engages said first blocking surfaces and subsequently engages said large diameter surfaces when said shift collar slides from said neutral position to said first gear position.

3. The transmission as set forth in claim 2 wherein said engaging surfaces of said apertures engages said second blocking surfaces and subsequently engages said large diameter surfaces when said shift collar slides from said neutral position to said second gear position.

4. A method of shifting between a plurality of gears comprising:

(a) decoupling a first gear and a shaft by moving a synchronizer shift collar out of engagement with the first gear;

(b) synchronizing a second gear and the shaft by moving the shift collar into engagement with second blocking pin surfaces;

(c) moving the shift collar into engagement with large diameter pin surfaces; and (d) coupling the second gear and the shaft by moving the shift collar into engagement with the second gear after disengaging the large diameter pin surfaces.

5. The method as set forth in claim 4 further comprising:

(e) decoupling the second gear and the shaft by moving the shift collar out of engagement with the second gear;

(f) synchronizing the first gear and the shaft by moving the shift collar into engagement with a set of first blocking pin surfaces;

(g) moving the shift collar into engagement with the large diameter pin surface; and (h) coupling the first gear and the shaft by moving the shift collar into engagement with the first gear after disengaging the large diameter pin surfaces.

\* \* \* \* \*